(12) United States Patent
Pandranki et al.

(10) Patent No.: US 9,914,888 B2
(45) Date of Patent: Mar. 13, 2018

(54) PROCESSES FOR TREATING A HYDROCARBON STREAM

(71) Applicant: UOP LLC, Des Plaines, IL (US)

(72) Inventors: Venkat Ram Naidu Pandranki, Dubai (AE); Krishnan Vaidyanathan, Dubai (AE); Satyam Mishra, Dubai (AE)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/224,269

(22) Filed: Jul. 29, 2016

(65) Prior Publication Data

US 2017/0037326 A1 Feb. 9, 2017

Related U.S. Application Data

(60) Provisional application No. 62/200,331, filed on Aug. 3, 2015.

(51) Int. Cl.
*C10G 65/12* (2006.01)
*B01D 53/22* (2006.01)

(52) U.S. Cl.
CPC ............ *C10G 65/12* (2013.01); *B01D 53/22* (2013.01); *B01D 2256/16* (2013.01); *B01D 2257/304* (2013.01); *B01D 2257/406* (2013.01); *C10G 2300/202* (2013.01); *C10G 2300/205* (2013.01)

(58) Field of Classification Search
CPC ..................................................... C10G 65/12
See application file for complete search history.

(56) References Cited

U.S. PATENT DOCUMENTS

| | | | |
|---|---|---|---|
| 4,362,613 A * | 12/1982 | MacLean | C10G 49/22 208/102 |
| 6,096,195 A | 8/2000 | Streicher et al. | |
| 6,190,540 B1 * | 2/2001 | Lokhandwala | C10G 49/007 208/100 |
| 8,486,258 B2 | 7/2013 | Podrebarac et al. | |
| 8,512,443 B2 | 8/2013 | Sundaram et al. | |
| 2011/0171117 A1 | 7/2011 | Gorski et al. | |
| 2015/0047503 A1 | 2/2015 | Hoehn et al. | |

OTHER PUBLICATIONS

Uehara. "Separation and purification of hydrogen", Energy Carriers and Conversion Systems. v 1.

* cited by examiner

*Primary Examiner* — Randy Boyer

(57) ABSTRACT

Processes for treating a hydrocarbon stream to remove heteroatoms from the hydrocarbons. A portion of the hydrotreated effluent is separated in a membrane separation zone to remove hydrogen sulfide and ammonia from the effluent portion which includes hydrogen. The hydrogen effluent portion may be recombined with the remaining hydrotreated effluent and passed to a hydrocracking zone. The hydrogen sulfide and ammonia may be combined with an effluent from the hydrocracking zone.

17 Claims, 1 Drawing Sheet

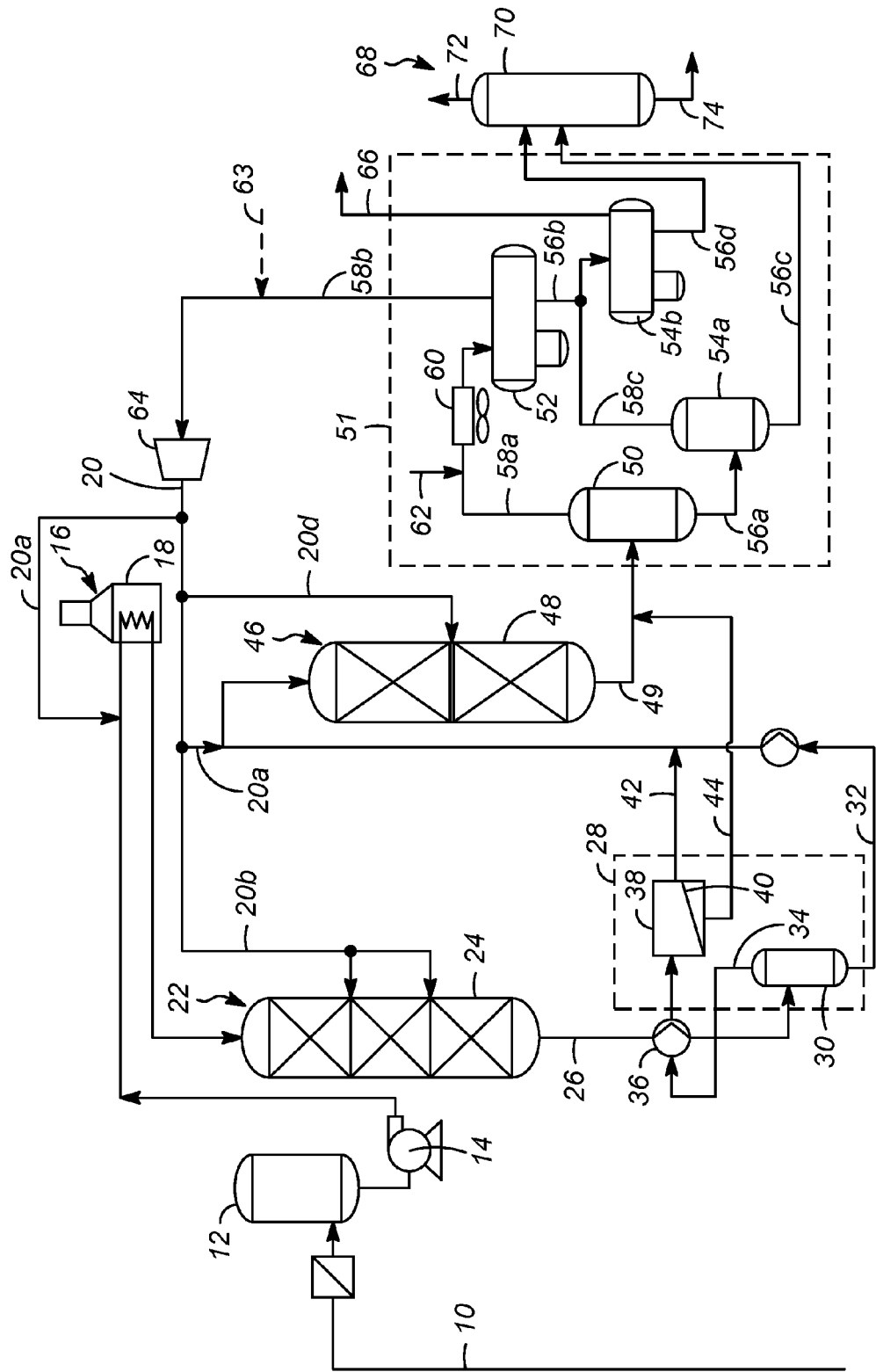

PROCESSES FOR TREATING A HYDROCARBON STREAM

CROSS-REFERENCE TO RELATED APPLICATION

This application claims priority from Provisional Application No. 62/200,331 filed Aug. 3, 2015, the contents of which are hereby incorporated by reference.

FIELD OF THE INVENTION

This invention relates generally to processes for treating a hydrocarbon stream, and more particular to processes which first remove heteroatoms and then crack the hydrocarbons.

BACKGROUND OF THE INVENTION

Petroleum refiners often produce desirable products such as diesel fuel, naphtha, and gasoline, by hydrocracking a hydrocarbon feedstock, normally derived from crude oil. Feedstocks, typically distillate feedstocks often subjected to hydrocracking are gas oils and heavy gas oils recovered from crude oil by distillation. For example, U.S. Pat. No. 4,943,366 discloses a hydrocracking process for converting highly aromatic, substantially dealkylated feedstock into high octane gasoline.

Refiners also subject distillate hydrocarbon streams to hydrotreating operations such as hydrodesulfurization and hydrodenitrogenation. In hydrodesulfurization, sulfur atoms are removed and typically converted into hydrogen sulfide. Similarly, in hydrodenitrogenation, nitrogen atoms are removed from the hydrocarbon and converted into ammonia. As discussed in U.S. Pat. No. 8,066,867, there are some benefits achieved by hydrotreating the feedstock before subjecting it to hydrocracking.

In such processes, in which a feed is first hydrotreated and then subjected to hydrocracking, hydrogen sulfide and ammonia may be passed to the hydrocracking zone. In the hydrocracking zone, the compounds will compete with the hydrocarbons for the activity sites on the hydrocracking catalyst and thus suppress the cracking catalyst activity. Additionally, the presence of hydrogen sulfide and ammonia in the hydrocracking zone will decrease the hydrogen partial pressure. Hence, lower hydrogen partial pressure and the presence of ammonia would increase the required temperature for a fixed volume of cracking catalyst. Alternatively, to maintain a lower cracking temperature, the catalyst volume has to be increased.

Accordingly, to address these issues, some prior processes have separated ammonia and hydrogen sulfide from a hydrotreated effluent before hydrocracking. From the separated gaseous phase, hydrogen is recovered, recompressed, and recirculated back to the hydrotreating zone. This hydrogen recovery will significantly increase the heater duty, as well as the compressor capacity for this recycle gas stream.

Accordingly, it would be desirable to provide efficient and effective processes which allow for ammonia and hydrogen sulfide to be separated from the hydrotreated effluent. It would further be desirable to have such processes that did not require such a large compressor capacity.

SUMMARY OF THE INVENTION

One or more processes for treating a hydrocarbon stream, and an apparatus of same, have been invented in which a membrane is used to separate the ammonia and the hydrogen sulfide between hydrotreating and hydrocracking.

In a first embodiment of the invention, the present invention may be characterized broadly as providing a process for producing a hydrocarbon fuel stream by: hydrotreating a hydrocarbon stream in a reaction zone in the presence of hydrogen and a hydrotreating catalyst to provide a hydrotreated effluent; separating a hydrogen rich stream and a contaminant rich stream from at least a portion of the hydrotreated effluent in a separation zone having a membrane configured to separate hydrogen from contaminants; and, hydrocracking the hydrotreated effluent in a second reaction zone in the presence of hydrogen and a hydrocracking catalyst to provide a hydrocracking zone, wherein the hydrocracking zone receives the hydrogen rich stream from the separation zone.

In at least one embodiment, the separation zone comprises a separator vessel configured to provide a liquid hydrocarbon stream and a gaseous stream, the gaseous steam comprising hydrogen, ammonia and hydrogen sulfide. It is contemplated that the membrane is disposed in a second vessel in the separation zone. It is also contemplated that the gaseous stream is heated between the first separator vessel and the second separator vessel.

In at least one embodiment, the contaminant rich stream is combined with the hydrocracked effluent stream.

In at least one embodiment, the hydrogen rich stream is mixed with a liquid portion of the hydrotreated effluent that is passed into the second reaction zone.

In at least one embodiment, the processes include separating the hydrotreated effluent into a liquid stream and a gaseous stream in the separation zone; and, separating the gaseous stream into the hydrogen rich stream and the contaminant rich stream with the membrane.

In at least one embodiment, the processes include combining the hydrogen rich stream with the liquid stream from the separation zone.

In a second aspect of the present invention, the present invention may be generally characterized as providing a process for producing a hydrocarbon fuel stream by: passing a hydrocarbon stream to a first reaction zone containing a vessel receiving hydrogen and having a catalyst for selectively removing contaminants from the hydrocarbon stream and being configured to provide a reactor effluent, the contaminants including sulfur and nitrogen; passing the reactor effluent to a separation zone configured to separate the effluent into a hydrogen rich stream, a contaminant rich stream and a liquid effluent stream, wherein the separation zone includes at least one vessel with a membrane; and, passing the liquid effluent stream and the hydrogen rich stream to a second reaction zone containing a vessel receiving hydrogen and having a catalyst for selectively reacting with hydrocarbons in the liquid effluent stream and being configured to provide a second reactor effluent.

In at least one embodiment, the first reaction zone comprises a hydrotreating zone, and wherein the second reaction zone comprises a hydrocracking zone. It is contemplated that the liquid effluent stream and the hydrogen rich stream are combined and passed as a combined stream into the hydrocracking zone.

In at least one embodiment, the processes include combining the second reactor effluent with the contaminant rich stream. It is contemplated that the process includes passing the second reactor effluent and the contaminant rich stream to a product separation zone configured to provide a treated product stream.

In at least one embodiment, the separation zone comprises two vessels, the first vessel configured to separate the reactor effluent into the liquid effluent stream and a gaseous stream, and the second vessel comprising the membrane and configure to separate the gaseous stream and provide the hydrogen rich stream and the contaminant rich stream. It is contemplated that the process includes heating the gaseous stream before passing the gaseous stream to the second vessel in the separation zone. It is contemplated that the membrane is configured to retain hydrogen in a residue stream, the residue stream comprising the hydrogen rich stream. It is contemplated that the membrane is configured to allow hydrogen to permeate in a permeate stream, the permeate stream comprising the hydrogen rich stream In a second aspect of the present invention, the present invention may be generally characterized as providing an apparatus comprising: a hydrotreating zone comprising a vessel having a catalyst for selectively removing contaminants and being configured to receive a hydrocarbon stream and a hydrogen stream and being further configured to provide a hydrotreated effluent; a separation zone having two vessels configured to separate the hydrotreated effluent into a hydrogen rich stream, a contaminant rich stream and a liquid effluent stream, wherein the first vessel is configured to separate the hydrotreated effluent into the liquid effluent stream and a gaseous stream, and wherein the second vessel includes a membrane and is configured to receive the gaseous stream from the first vessel, and provide the hydrogen rich stream and the contaminant rich stream; and, a hydrocracking zone comprising a vessel having a catalyst for selectively reacting with hydrocarbons in the liquid effluent stream and being configured to receive the liquid effluent stream and the hydrogen rich stream from the second vessel of the separation zone and being further configured to provide a hydrocracked effluent.

In at least one embodiment, the apparatus includes a line configured to combine the hydrogen rich stream from the second vessel of the separation zone with the liquid effluent stream from the first separation vessel of the separation zone. It is contemplated that the apparatus also includes a bypass line configured to combine the contaminant rich stream with the hydrocracked effluent.

Additional aspects, embodiments, and details of the invention, all of which may be combinable in any manner, are set forth in the following detailed description of the invention.

BRIEF DESCRIPTION OF THE DRAWING

One or more exemplary embodiments of the present invention will be described below in conjunction with the following FIGURE, in which:

The FIGURE shows a process flow diagram with a schematic diagram according to one or more embodiments of the present invention.

DETAILED DESCRIPTION OF THE INVENTION

As mentioned above, processes for treating a hydrocarbon stream, and an apparatus for same, have been invented in which a membrane is used to separate ammonia and hydrogen sulfide between hydrotreating and hydrocracking zones. The ammonia and the hydrogen sulfide are preferably separated from a stream of hot hydrogen gas which can be re-combined with to the liquid portion of the hydrotreated effluent and passed to the hydrocracking reaction zone. The membrane separation should lead to significant reduction in capital cost by requiring a smaller recycle gas compressor. Additionally, such separation processes are believed to result in a reduction in heater duty. Finally, the lower level of ammonia and hydrogen sulfide in the hydrocracking reaction is believed to provide for a better product selectivity and higher catalyst cycle length.

With these general principles in mind, one or more embodiments of the present invention will be described with the understanding that the following description is not intended to be limiting.

As shown in the FIGURE, in accordance with an exemplary embodiment, a process for hydrotreating a hydrocarbon stream, preferably comprising a petroleum distillate feedstock 10, is shown. The petroleum distillate feedstock 10, may be commercially available or available elsewhere in the same refinery used to process renewable feedstock into green diesel fuel and other possible co-products. As will be appreciated, the petroleum distillate feedstock 10, may be pretreated.

The petroleum distillate feedstock 10, is generally a distillable petroleum-derived fraction having a boiling point range which is above that of naphtha. Suitable petroleum distillate feedstocks 10 that may be obtained from refinery fractionation and conversion operations include middle distillate hydrocarbon streams, such as highly aromatic hydrocarbon streams. The petroleum distillate feedstock 10, as hereinafter described include distillate hydrocarbons boiling at a temperature greater than about 149° C. (300° F.), typically boiling in the range from about 149 to 399° C. (300 to 750° F.), and often boiling in the range from about 204 to about 371° C. (400 to 700° F.).

Representative petroleum distillate feedstocks 10, include various other types of hydrocarbon mixtures, such as straight-run fractions, or blends of fractions, recovered by fractional distillation of crude petroleum. Such fractions produced in refineries include coker gas oil and other coker distillates, straight run gas oil, deasphalted gas oil, and vacuum gas oil. These fractions or blends of fractions can therefore be a mixture of hydrocarbons boiling in range from about 343 to about 566° C. (650 to 1050° F.), with boiling end points in other embodiments being below about 538° C. (1000° F.) and below about 482° C. (900° F.). Thus, the petroleum distillate feedstock 10, are often recovered from crude oil fractionation or distillation operations, and optionally following one or more hydrocarbon conversion reactions. However, the petroleum distillate feedstock 10, may be utilized from any convenient source such as tar sand extract (bitumen) and gas to liquids conversion products, as well as synthetic hydrocarbon mixtures such as recovered from shale oil or coal.

Highly aromatic, substantially dealkylated hydrocarbons, especially suitable as the petroleum distillate feedstock 10, are produced during fluid catalytic cracking (FCC) of vacuum gas oils to produce high octane gasoline boiling range hydrocarbons. FCC is a thermally severe process which is operated without the presence of added hydrogen to reject carbon to coke and to produce residual fractions. During catalytic cracking, the components of the high molecular weight feedstock disproportionate into relatively hydrogen-rich light liquids and aromatic, hydrogen-deficient heavier distillates and residues. Catalytic cracking in the absence of hydrogen does not provide significant desulfurization, nor are the sulfur- and nitrogen-containing compounds of the FCC feed selectively rejected with the coke. These sulfur and nitrogen compounds therefore concentrate in heavier cracked products that are produced in significant quantities and characterized as being highly aromatic, hydrogen-deficient middle and heavy distillates with high sulfur and nitrogen levels. One such product is known in the refining industry as Light Cycle Oil (LCO), which is often characterized in the industry as a "cracked stock" or "cracked stock boiling in the distillate range." References throughout this disclosure to a "distillate" or a "petroleum distillate feedstock" are therefore understood to include converted hydrocarbon products, such as LCO, having boiling ranges that are representative of distillate fractions. Highly aromatic petroleum distillate feedstocks such as LCO therefore comprise a significant fraction of polyaromatics such as 2-ring aromatic compounds (e.g., fused aromatic rings such as naphthalene and naphthalene derivatives) as well as multi-ring aromatic compounds. Typically, the combined amount of 2-ring aromatic compounds and multi-ring aromatic compounds is at least about 40 wt %, normally at least about 60 wt %, and often at least about 70 wt %, of the petroleum distillate feedstock 10, whereas the amount of mono-ring aromatic compounds (e.g., benzene at benzene derivatives such as alkylaromatic compounds) typically represents at most about 40 wt %, normally at most about 25 wt %, and often at most about 15 wt %, of the petroleum distillate feedstock 10.

The petroleum distillate feedstock 10 suitable for use according to exemplary embodiments will contain organic nitrogen compounds and organic sulfur compounds. For example, LCO and other petroleum distillate feedstocks 10 typically contain from about 0.1 to about 4%, normally from about 0.2 to about 2.5%, and often from about 0.5 to about 2%, by weight of total sulfur, substantially present in the form of organic sulfur compounds such as alkylbenzothiophenes. Such petroleum distillate feedstocks 10 also generally contain from about 100 ppm to about 1000 ppm, and normally from about 100 ppm to about 750 ppm, by weight of total nitrogen, substantially present in the form of organic nitrogen compounds such as non-basic aromatic compounds including carbazoles. In order to reduce the sulfur and nitrogen content the petroleum distillate feedstock 10 is hydrotreated.

Returning to the FIGURE, the petroleum distillate feed 10 may be passed to a distillate feed surge drum 12. The petroleum distillate feed 10 flows from the distillate feed surge drum 12 via a distillate charge pump 14 to a heating zone 16 having, for example a charge heater 18. Other heating sources may be used, such as for example, a heat exchanger. Prior to or after being heated, the petroleum distillate feed 10 may be combined with a hydrogen gas stream 20a (discussed in more detail below) and which may comprise a recycle gas stream, a fresh hydrogen gas stream, or a combination thereof. The heated petroleum distillate feed 10, along with the hydrogen gas, may be passed into a hydrotreating reaction zone 22.

The hydrotreating reaction zone 22 comprises one or more a reaction vessels 24 which include a catalyst and which are operated under appropriate conditions such that the organic sulfur compounds in the petroleum distillate feedstock are removed and converted into hydrogen sulfide ($H_2S$) and the organic nitrogen compounds are removed and converted into ammonia ($NH_3$). As used herein, "hydrotreating" refers to desulfurization and denitrogenation of the petroleum distillate feedstock 10 containing sulfur and nitrogen, as hereinafter described. Hydrotreating catalysts and conditions are known to one skilled in the art. Exemplary hydrotreating catalysts comprise Group VIII metals such as nickel and/or cobalt and Group VI metals such as molybdenum and/or tungsten on a high surface area support such as alumina. The Group VIII metal typically comprises about 2 to about 20 wt % and the Group VI metal typically comprises about 1 to about 25 wt %. Exemplary hydrotreating conditions comprise a temperature of about 260 to about 454° C., a hydrogen partial pressure of about 2,000 to about 14,000 kPa (typically about 4,000 to about 7,000 kPa), and a liquid hourly space velocity (LHSV) of about 0.5 to about 10 $hr^{-1}$ (typically about 1 $hr^{-1}$ to about 3 $hr^{-1}$). A hydrogen containing gas 20b can also be passed directly into the vessel 24 of the hydrotreating reaction zone 22.

A hydrotreated effluent 26 from the hydrotreating reaction zone 22 will comprises a mixture of desulfurized hydrocarbons, hydrogen sulfide, and ammonia. Although not depicted as such, it is contemplated that the effluent 26 from the hydrotreating reaction zone 22 may heat the petroleum distillate feedstock 10 in a heat exchanger.

From the hydrotreating reaction zone 22, the hydrotreated effluent 26 is passed to a separation zone 28 configured to utilize a membrane to separate hydrogen sulfide and ammonia from at least a portion of the hydrotreated effluent 26. In the depicted separation zone 28, the hydrotreated effluent 26 is passed to a first separation vessel 30 in which the hydrotreated effluent 26 can be separated. More specifically, in the first separation vessel 30, the hydrotreated effluent 26 is preferably separated into a liquid hydrotreated effluent 32 and a gaseous hydrotreated effluent 34. The gaseous hydrotreated effluent 34 will include the ammonia and hydrogen sulfide.

In order to recover hydrogen from the gaseous hydrotreated effluent 34, the gaseous hydrotreated effluent 34 may be heated in a heat exchanger 36, by the hydrotreated effluent 26 for example, and then passed to a second vessel 38 in the separation zone 28. The second vessel 38 includes the membrane 40. The membrane 40 will separate the gaseous hydrotreated effluent 34 into a hydrogen rich stream 42 and a contaminant rich stream 44. Depending on the type of membrane 40, the hydrogen rich stream 42 may comprise the retenate (as depicted), with the contaminant rich stream 44 comprising the permeate. Alternatively, the contaminant rich stream 44 may comprise the retenate, while the hydrogen rich stream 42 may comprise the permeate. The membrane 40 can be any type of membrane that can tolerate the hydrogen sulfide contaminants, such as palladium-alloy membrane, for example available from the Pall Corporation (Port Washington, N.Y., US).

The contaminant rich stream 44 comprises ammonia, hydrogen sulfide, and may also comprise hydrogen and lighter hydrocarbons. Accordingly, the contaminant rich stream 44 may be treated in any known manner; however as discussed in more detail below, in at least one embodiment of the present invention, the contaminant rich stream 44 is combined with an effluent stream from a hydrocracking zone 46 via, for example a bypass line which bypasses hydrocracking zone 46. The hydrogen rich stream 42 may be combined, via a line, with the liquid hydrotreated effluent 32 and passed to the hydrocracking zone 46. Alternatively, the hydrogen rich stream 42 may be passed directly to the hydrocracking zone 46 (without being combined with the liquid hydrotreated effluent 32). Additionally, as shown in the FIGURE, the liquid hydrotreated effluent 32 may be combined with a recycled or make-up hydrogen containing gas 20c.

The hydrocracking zone 46 comprises at least one vessel 48 with a suitable acidic hydrocracking catalyst and is operated under suitable conditions to break the larger hydrocarbon molecules into smaller, more desirable hydrocarbons. As is known, a hydrocracking catalyst comprising a hydrogenation component, for example a Group VIII metal component and/or a Group VIB metal component, generally dispersed on a support. More specifically, the hydrocracking catalyst typically contains between 5 and 50 wt % of a Group VIB metal component, measured as the trioxide, and/or between 2 and 20 wt % of a Group VIII metal component, measured as the monoxide, supported on a suitable refractory oxide. In order to provide an acidic base for the hydrocracking catalyst, the support may be an amorphous silica-alumina or zeolite. Other refractory oxides may also be utilized. The catalyst can be produced by conventional methods including impregnating a preformed catalyst support. Other methods include co-gelling, co-mulling or precipitating the catalytic metals with the catalyst support followed by calcination. Preferred catalysts contain amorphous oxide supports which are extruded and subsequently impregnated with catalytic metals.

The hydrocracking zone 46 is preferably operated at conditions which include a temperature from about 232 to about 427° C. (450 to 800° F.), a pressure from about 3.5 to about 17.2 MPa (500 to 2,500 psig), and a liquid hourly space velocity from about 0.5 to about 5 $hr^{-1}$. The operating conditions in the hydrocracking zone 46 are selected to preferably convert at least about 20% of the material in the liquid hydrotreated effluent 32 into lighter hydrocarbons. A hydrogen containing gas 20d may also be passed to the hydrocracking zone 46.

From the hydrocracking zone 46, a hydrocracked effluent stream 49 may heat the liquid hydrotreated effluent 32 in a heat exchanger (not shown). Additionally, the hydrocracked effluent stream 49 may be combined with the contaminant rich stream 44, to recover any hydrogen and light hydrocarbons from the contaminant rich stream along with the hydrocracked effluent stream, and passed to a product recovery zone 51 typically comprising a hot separator vessel 50, a cold separator vessel 52, and flash vessels 54a, 54b.

As will be appreciated, in the hot separator vessel 50, the hydrocracked effluent stream 49 (and the contaminant rich stream 44 in some embodiments) will separate into a first liquid stream 56a and a first vapor stream 58a. The first vapor stream 58a may pass through a condenser 60 and then to the cold separator vessel 52. As depicted, a wash water stream 62 may be added to the first vapor stream 58a before the first vapor stream 58a passes through the condenser 60 to dissolve any salts present. In the cold separator vessel 52, the first vapor stream 58a will again separate into a second vapor stream 58b and a second liquid stream 56b. Additionally, a sour water stream (not shown) including hydrogen sulfide and ammonia may be recovered from the cold separator vessel 52.

The second vapor stream 58b can be treated in a scrubbing zone (not shown) to remove any contaminants such as hydrogen sulfide and carbon dioxide. The carbon dioxide can be removed by means well known in the art such as absorption with an amine, reaction with a hot carbonate solution, pressure swing absorption, etc. The scrubbing zone may also removes the dilute hydrogen sulfide from the second vapor stream 58b from the cold separator 52. Since the second vapor stream also comprises unreacted hydrogen, after being scrubbed, it may be passed to a compressor 64 to provide a hydrogen containing gas steam 20, which can be used as any of the hydrogen containing gases 20a, 20b 20c, 20d discussed above. Additionally, a fresh or make up hydrogen gas stream 63 may also be combined with the second vapor stream 58b before it passes through the compressor 64.

Returning to the hot separator vessel 50, the first liquid stream 56a may be passed to a first flash vessel 54a to provide a third vapor stream 58c and a third liquid stream 56c. The third vapor stream 58c may be passed through a condenser (not shown) and then to a second flash vessel 54b, along with the second liquid stream 56b from the cold separator vessel 52, to provide an off gas stream 66 and a fourth liquid stream 56d.

The third liquid stream 56c and the fourth liquid stream 56d, from the first flash vessel 54a and the second flash vessel 54b, respectively, of the hydrocracked effluent stream 49 can be sent to a stripping zone 68 having a stripping column 70 comprising trays or packing to separate the components of the liquid streams 56c, 56d into an overhead 72 comprising stripper off-gas and a stripper bottoms stream 74 which comprises a sweetened effluent stream. The stripper bottoms stream 74 may be heated and passed to a fractionation column (not shown) to provide one or more transportation fuels streams, such as a naphtha stream and a diesel stream.

For a hydrocracker unit loaded with hydrotreating and hydrocracking catalyst; processing a feed with 1100 wppm of nitrogen, reducing the ammonia in the recycle gas to 100 ppm would allow the unit to utilize a hydrocracking catalyst temperature that is 50° F. lower. Furthermore, while the use of the membrane may lower the operating pressure of the hydrocracking zone, the impact of the removal of the hydrogen sulfide and ammonia is be greater in terms of the average reactor bed temperatures. For example, reducing an operating pressure of the hydrocracking reaction zone from about 17,237 to 12,411 kPag (2500 to 1800 psig) would have only a minor impact on reactor temperatures to achieve similar cracking in hydrocracking reactor.

In sum, by removing the hydrogen sulfide and the ammonia, the hydrocracking catalysts should have a longer cycle time as less contaminants should be passed to the hydrocracking rezone. Moreover, the reactions in the hydrocracking zone should have a higher selectivity to the desired products. By removing the hydrogen sulfide and the ammonia with a membrane, the recycle gas compressor may be smaller and a lower heater duty may be required.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for producing a hydrocarbon fuel stream, the process comprising hydrotreating a hydrocarbon stream in a reaction zone in the presence of hydrogen and a hydrotreating catalyst to provide a hydrotreated effluent; separating a hydrogen rich stream and a contaminant rich stream from at least a portion of the hydrotreated effluent in a separation zone having a membrane configured to separate hydrogen from contaminants; and, hydrocracking the hydrotreated effluent in a second reaction zone in the present of hydrogen and a hydrocracking catalyst to provide a hydrocracked catalyst, wherein the hydrocracking zone receives the hydrogen rich stream from the separation zone. An embodiment of the invention is one, any or all of prior embodiments in this paragraph up through the first embodiment in this paragraph wherein the separation zone comprises a separator vessel configured to provide a liquid hydrocarbon stream and a gaseous stream, the gaseous steam comprising hydrogen, ammonia and hydrogen sulfide. An embodiment of the invention is one, any or all of prior embodiments in this paragraph up through the first embodiment in this paragraph wherein the membrane is disposed in a second vessel in the separation zone. An embodiment of the invention is one, any or all of prior embodiments in this paragraph up through the first embodiment in this paragraph wherein the gaseous stream is heated between the first separator vessel and the second separator vessel. An embodiment of the invention is one, any or all of prior embodiments in this paragraph up through the first embodiment in this paragraph wherein the contaminant rich stream is combined with the hydrocracked effluent stream. An embodiment of the invention is one, any or all of prior embodiments in this paragraph up through the first embodiment in this paragraph wherein hydrogen rich stream is mixed with a liquid portion of the hydrotreated effluent that is passed into the second reaction zone. An embodiment of the invention is one, any or all of prior embodiments in this paragraph up through the first embodiment in this paragraph further comprising separating the hydrotreated effluent into a liquid stream and a gaseous stream in the separation zone; and, separating the gaseous stream into the hydrogen rich stream and the contaminant rich stream with the membrane. An embodiment of the invention is one, any or all of prior embodiments in this paragraph up through the first embodiment in this paragraph further comprising combining the hydrogen rich stream with the liquid stream from the separation zone.

A second embodiment of the invention is a process for producing a hydrocarbon fuel stream, the process comprising passing a hydrocarbon stream to a first reaction zone containing a vessel receiving hydrogen and having a catalyst for selectively removing contaminants like sulfur, nitrogen in the hydrocarbon stream and being configured to provide a reactor effluent; passing the reactor effluent to a separation zone configured to separate the effluent into a hydrogen rich stream, a contaminant rich stream and a liquid effluent stream, wherein the separation zone includes at least one vessel with a membrane; and, passing the liquid effluent stream and the hydrogen rich stream to a second reaction zone containing a vessel receiving hydrogen and having a catalyst for selectively reacting with hydrocarbons in the liquid effluent stream and being configured to provide a second reactor effluent. An embodiment of the invention is one, any or all of prior embodiments in this paragraph up through the second embodiment in this paragraph wherein the first reaction zone comprises a hydrotreating zone, and wherein the second reaction zone comprises a hydrocracking zone. An embodiment of the invention is one, any or all of prior embodiments in this paragraph up through the second embodiment in this paragraph wherein the liquid effluent stream and the hydrogen rich stream are combined and passed as a combined stream into the hydrocracking zone. An embodiment of the invention is one, any or all of prior embodiments in this paragraph up through the second embodiment in this paragraph further comprising combining the second reactor effluent with the contaminant rich stream. An embodiment of the invention is one, any or all of prior embodiments in this paragraph up through the second embodiment in this paragraph further comprising passing the second reactor effluent and the contaminant rich stream to a product separation zone configured to provide a treated product stream. An embodiment of the invention is one, any or all of prior embodiments in this paragraph up through the second embodiment in this paragraph wherein the separation zone comprises two vessels, the first vessel configured to separate the reactor effluent into the liquid effluent stream and a gaseous stream, and the second vessel comprising the membrane and configure to separate the gaseous stream and provide the hydrogen rich stream and the contaminant rich stream. An embodiment of the invention is one, any or all of prior embodiments in this paragraph up through the second embodiment in this paragraph further comprising heating the gaseous stream before passing the gaseous stream to the second vessel in the separation zone. An embodiment of the invention is one, any or all of prior embodiments in this paragraph up through the second embodiment in this paragraph wherein the membrane is configured to retain hydrogen in a residue stream, the residue stream comprising the hydrogen rich stream. An embodiment of the invention is one, any or all of prior embodiments in this paragraph up through the second embodiment in this paragraph wherein the membrane is configured to allow hydrogen to permeate in a permeate stream, the permeate stream comprising the hydrogen rich stream.

A third embodiment of the invention is an apparatus for producing a treated hydrocarbon stream, the apparatus comprising a hydrotreating zone comprising a vessel having a catalyst for selectively removing contaminants and being configured to receive a hydrocarbon stream and a hydrogen stream and being further configured to provide a hydrotreated effluent; a separation zone having two vessels configured to separate the hydrotreated effluent into a hydrogen rich stream, a contaminant rich stream and a liquid effluent stream, wherein the first vessel is configured to separate the hydrotreated effluent into the liquid effluent stream and a gaseous stream, and wherein the second vessel includes a membrane and is configured to receive the gaseous stream from the first vessel, and provide the hydrogen rich stream and the contaminant rich stream; and, a hydrocracking zone comprising a vessel having a catalyst for selectively reacting with hydrocarbons in the liquid effluent stream and being configured to receive the liquid effluent stream and the hydrogen rich stream from the second vessel of the separation zone and being further configured to provide a hydrocracked effluent. An embodiment of the invention is one, any or all of prior embodiments in this paragraph up through the third embodiment in this paragraph further comprising a line configured to combine the hydrogen rich stream from the second vessel of the separation zone with the liquid effluent stream from the first separation vessel of the separation zone. An embodiment of the invention is one, any or all of prior embodiments in this paragraph up through the third embodiment in this paragraph further comprising a bypass line configured to combine the contaminant rich stream with the hydrocracked effluent.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for producing a hydrocarbon fuel stream, the process comprising:
   hydrotreating a hydrocarbon stream in a reaction zone in the presence of hydrogen and a hydrotreating catalyst to provide a hydrotreated effluent;
   separating a hydrogen rich stream and a contaminant rich stream from at least a portion of the hydrotreated effluent in a separation zone having a membrane configured to separate hydrogen from contaminants; and,
   hydrocracking the hydrotreated effluent in a second reaction zone in the presence of hydrogen and a hydrocracking catalyst to provide a hydrocracked effluent, wherein the second reaction zone receives the hydrogen rich stream from the separation zone.

2. The process of claim 1 wherein the separation zone comprises a first separator vessel configured to provide a liquid hydrocarbon stream and a gaseous stream, the gaseous steam comprising hydrogen, ammonia and hydrogen sulfide.

3. The process of claim 2 wherein the membrane is disposed in a second separator vessel in the separation zone.

4. The process of claim 3 wherein the gaseous stream is heated between the first separator vessel and the second separator vessel.

5. The process of claim 1 wherein the contaminant rich stream is combined with a hydrocracked effluent stream.

6. The process of claim 1 wherein hydrogen rich stream is mixed with a liquid portion of the hydrotreated effluent that is passed into the second reaction zone.

7. The process of claim 1 further comprising:
   separating the hydrotreated effluent into a liquid stream and a gaseous stream in the separation zone; and,
   separating the gaseous stream into the hydrogen rich stream and the contaminant rich stream with the membrane.

8. The process of claim 7 further comprising:
   combining the hydrogen rich stream with the liquid stream from the separation zone.

9. A process for producing a hydrocarbon fuel stream, the process comprising:
   passing a hydrocarbon stream to a first reaction zone containing a vessel receiving hydrogen and having a catalyst for selectively removing contaminants including sulfur and nitrogen from hydrocarbons in the hydrocarbon stream and being configured to provide a reactor effluent;
   passing the reactor effluent to a separation zone configured to separate the reactor effluent into a hydrogen rich stream, a contaminant rich stream and a liquid effluent stream, wherein the separation zone includes at least one vessel with a membrane; and,
   passing the liquid effluent stream and the hydrogen rich stream to a second reaction zone containing a vessel receiving hydrogen and having a catalyst for selectively reacting with hydrocarbons in the liquid effluent stream and being configured to provide a second reactor effluent.

10. The process of claim 9 wherein the first reaction zone comprises a hydrotreating zone, and wherein the second reaction zone comprises a hydrocracking zone.

11. The process of claim 10 wherein the liquid effluent stream and the hydrogen rich stream are combined and passed as a combined stream into the hydrocracking zone.

12. The process of claim 9 further comprising:
   combining the second reactor effluent with the contaminant rich stream.

13. The process of claim 12 further comprising:
   passing the second reactor effluent and the contaminant rich stream to a product separation zone configured to provide a treated product stream.

14. The process of claim 9 wherein the separation zone comprises two vessels, the first vessel configured to separate the reactor effluent into the liquid effluent stream and a gaseous stream, and the second vessel comprising the membrane and configured to separate the gaseous stream and provide the hydrogen rich stream and the contaminant rich stream.

15. The process of claim 14 further comprising:
   heating the gaseous stream before passing the gaseous stream to the second vessel in the separation zone.

16. The process of claim 15 wherein the membrane is configured to retain hydrogen in a residue stream, the residue stream comprising the hydrogen rich stream.

17. The process of claim 15 wherein the membrane is configured to allow hydrogen to permeate in a permeate stream, the permeate stream comprising the hydrogen rich stream.

* * * * *